US012682333B2

(12) United States Patent
Ishida et al.

(10) Patent No.: US 12,682,333 B2
(45) Date of Patent: Jul. 14, 2026

(54) STORAGE MEDIUM AND INFORMATION PROCESSING DEVICE

(71) Applicant: Fujitsu Limited, Kawasaki (JP)

(72) Inventors: Ryo Ishida, Kawasaki (JP); Daisuke Uchida, Kawasaki (JP); Yasuhiro Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 18/494,825

(22) Filed: Oct. 26, 2023

(65) Prior Publication Data

US 2024/0193573 A1 Jun. 13, 2024

(30) Foreign Application Priority Data

Dec. 7, 2022 (JP) .................................. 2022-195933

(51) Int. Cl.
 *G06Q 20/20* (2012.01)
 *G06T 7/50* (2017.01)
 (Continued)

(52) U.S. Cl.
 CPC ............. *G06Q 20/208* (2013.01); *G06T 7/50* (2017.01); *G06T 7/62* (2017.01); *G06T 7/90* (2017.01);
 (Continued)

(58) Field of Classification Search
 CPC ........... G06Q 20/208; G06T 7/62; G06T 7/50; G06T 7/90; G06T 2207/10024; G06V 40/20
 See application file for complete search history.

(56) References Cited

U.S. PATENT DOCUMENTS 11,861,584 B2 * 1/2024 Shi ........................ G06Q 20/201
2019/0147614 A1 * 5/2019 Hamzic ................ G07G 1/0063
 382/154
(Continued)

FOREIGN PATENT DOCUMENTS

JP 2020-53019 4/2020
WO 2019/062017 A1 4/2019

OTHER PUBLICATIONS

Wei, Yuchen, et al. "Deep learning for retail product recognition: Challenges and techniques." Computational intelligence and neuroscience 2020.1 (2020): 8875910. (Year: 2020).*
(Continued)

*Primary Examiner* — Nathan A Mitchell
(74) *Attorney, Agent, or Firm* — Fujitsu Intellectual Property Center

(57) ABSTRACT

A non-transitory computer-readable storage medium storing an information processing program that causes at least one computer to execute a process, the process includes acquiring video data of a product placed on a scale included in a registration machine; specifying an attribute regarding an appearance of the product, by inputting the acquired video data into a first machine learning model; acquiring information regarding a weight of the product, from the accounting machine that has measured a weight of the product placed on the scale; and performing machine learning of a second machine learning model, by using the specified attribute of the product as training data and the acquired information regarding the weight of the product as correct answer data.

6 Claims, 15 Drawing Sheets

(51) Int. Cl.
    *G06T 7/62*       (2017.01)
    *G06T 7/90*       (2017.01)
    *G06V 40/20*     (2022.01)

(52) U.S. Cl.
    CPC .... *G06V 40/20* (2022.01); *G06T 2207/10024*
                                            (2013.01)

(56)                      References Cited

U.S. PATENT DOCUMENTS

| | | | |
|---|---|---|---|
| 2020/0020112 A1 | 1/2020 | Buibas et al. | |
| 2020/0042491 A1* | 2/2020 | Licht | G07G 1/0045 |
| 2020/0151692 A1* | 5/2020 | Gao | G07G 1/0063 |
| 2021/0279505 A1* | 9/2021 | Zhong | G07G 1/0063 |
| 2022/0138465 A1* | 5/2022 | Herz | G06N 3/04 |
| | | | 382/103 |
| 2022/0327511 A1* | 10/2022 | Agrawal | G06N 20/00 |
| 2022/0327777 A1* | 10/2022 | Buibas | G06T 15/04 |
| 2023/0098811 A1* | 3/2023 | Shevtsov | G06Q 20/206 |
| | | | 705/16 |
| 2023/0177391 A1* | 6/2023 | Packwood | G06V 20/52 |
| | | | 706/12 |
| 2023/0184579 A1* | 6/2023 | Gettle | G06Q 20/208 |
| 2024/0193573 A1* | 6/2024 | Ishida | G06T 7/62 |
| 2024/0242193 A1* | 7/2024 | Steiner | G06V 10/82 |
| 2024/0412188 A1* | 12/2024 | Holub | G06K 7/1447 |

OTHER PUBLICATIONS

EESR—Extended European Search Report of European Patent Application No. 23207399.9 dated Mar. 13, 2024 [7 pages].

* cited by examiner

FIG. 4

| EXPLANATORY VARIABLE | OBJECTIVE VARIABLE |
|---|---|
| IMAGE DATA | ATTRIBUTE (COLOR: WHITE, SIZE: ○○, SHAPE: ××) |
| ... | ... |

STORAGE MEDIUM AND INFORMATION PROCESSING DEVICE

CROSS-REFERENCE TO RELATED APPLICATION

This application is based upon and claims the benefit of priority of the prior Japanese Patent Application No. 2022-195933, filed on Dec. 7, 2022, the entire contents of which are incorporated herein by reference.

FIELD

The embodiments discussed herein are related to a storage medium and an information processing device.

BACKGROUND

In stores such as supermarkets and convenience stores, self-checkout machines are becoming popular. The self-checkout machine is a point of sale (POS) cash register system by which a user who purchases a product himself/herself performs operations from reading of a barcode of the product to payment. For example, by introducing the self-checkout machine, it is possible to overcome shortage of labor caused by population reduction and suppress labor cost.

Japanese Laid-open Patent Publication No. 2020-53019 is disclosed as related art.

SUMMARY

According to an aspect of the embodiments, a non-transitory computer-readable storage medium storing an information processing program that causes at least one computer to execute a process, the process includes acquiring video data of a product placed on a scale included in a registration machine; specifying an attribute regarding an appearance of the product, by inputting the acquired video data into a first machine learning model; acquiring information regarding a weight of the product, from the accounting machine that has measured a weight of the product placed on the scale; and performing machine learning of a second machine learning model, by using the specified attribute of the product as training data and the acquired information regarding the weight of the product as correct answer data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining training data used to train a first machine learning model;

DESCRIPTION OF EMBODIMENTS

With the above technology, it is difficult to detect fraud. For example, in an accounting machine such as a self-checkout machine, a force majeure error, intentional fraud, or the like by a user occurs, and unpaid amount or the like is caused.

The force majeure error includes a scan omission in which a user forgets to scan a product and moves the product from a basket to a plastic bag, or the like. Furthermore, the intentional fraud includes barcode concealment for pretending to scan a product while hiding only the barcode with the finger of the user, fraud for intentionally lowering an amount to be paid, by selecting another inexpensive product different from an actual product or inputting the number less than the actual number, in a case of a shopping method for selecting a price of a product with no barcode on a cash register screen (for example, called banana trick or the like), or the like.

In one aspect, an object is to provide an information processing program and an information processing device that can generate a machine learning model for detecting an error or fraud of a user, for an accounting machine.

According to one embodiment, it is possible to generate a machine learning model for detecting an error or fraud of a user, for an accounting machine.

Hereinafter, embodiments of an information processing program and an information processing device disclosed in the present application will be described in detail with reference to the drawings. Note that these embodiments do not limit the present disclosure. Furthermore, the embodiments may be appropriately combined with each other in a range without contradiction.

First Embodiment

<Overall Configuration of System>

Figure 1:
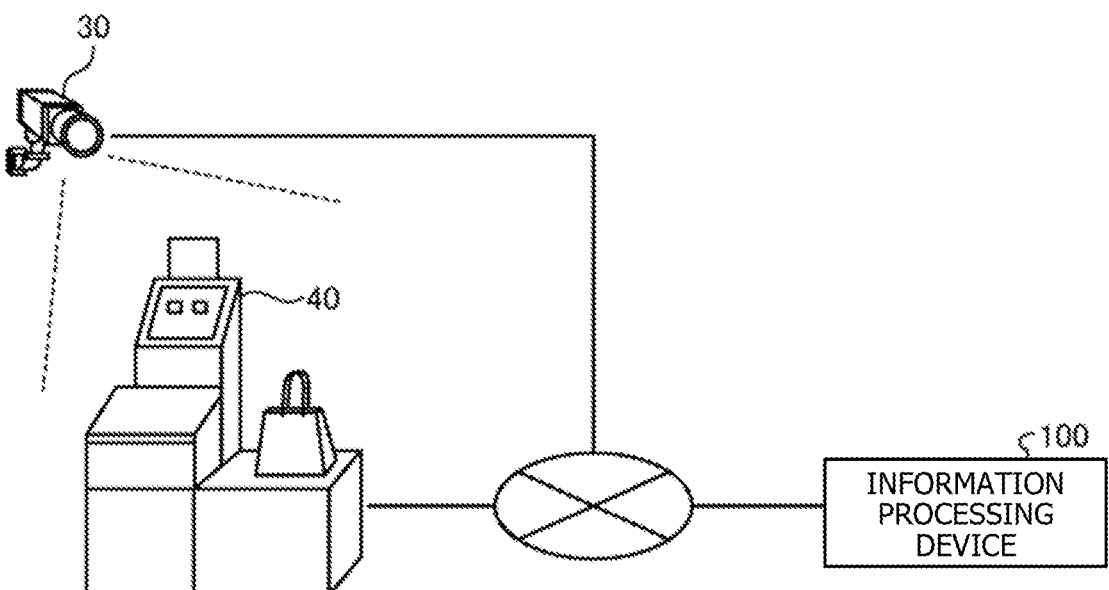
FIG. 1 is a diagram illustrating an overall configuration example of a cash register system according to a first embodiment.

FIG. 1 is a diagram illustrating an overall configuration example of a cash register system according to a first embodiment. As illustrated in FIG. 1, in this system, a camera 30, an accounting machine 40, and an information processing device 100 are coupled via a wired or wireless network.

The camera 30 is an example of a camera that captures a video of a region including the accounting machine 40. The camera 30 transmits data of a video to the information processing device 100. In the following description, there is a case where the data of the video is referred to as "video data" or is simply referred to as a "video".

The video data includes a plurality of time-series image frames. To each image frame, a frame number is assigned in a time-series ascending order. One image frame is image data of a still image captured by the camera 30 at a certain timing. In the following description, there is a case where the image data is simply referred to as an "image".

The accounting machine 40 is an example of a POS cash register system or an accounting machine that reads a barcode of a product or the like, specifies a price of the product, and performs operations from calculation of a total amount of purchased products to payment. For example, the accounting machine 40 is a cash register with which a clerk scans a product, a self-checkout machine with which a user 2 who purchases a product performs operations from reading of a barcode of the product to payment, or the like. For example, in a case of the self-checkout machine, when the user 2 moves a product to be purchased to a scan region of the self-checkout machine 50, the self-checkout machine 50 scans the barcode of the product and registers the product as a product to be purchased.

Furthermore, the accounting machine 40 includes a scale unit and can specify a weight of the product. For example, the accounting machine 40 can specify the weight of the product with the scale unit where the product is placed and specify a price of the product based on the weight. The scale unit detects that a weight of the product placed on a scale pan increases. The accounting machine 40 specifies the weight of the product, based on the detected weight change. The product to be measured is a product of which a price varies depending on the weight or the number of products. The product to be measured is, for example, fresh foods such as vegetables, fruits, fish, or meat, daily dishes, or the like.

The information processing device 100 is an example of a computer that is coupled to the camera 30 and the accounting machine 40, via a network 3 for which various wired and wireless communication networks can be adopted. The information processing device 100 trains a second machine learning model that estimates a weight of a product depending on an input of an attribute of the product, using various types of data acquired from the camera 30 and the accounting machine 40.

Specifically, the information processing device 100 acquires video data of the product placed on the scale unit of the accounting machine 40. The information processing device 100 specifies an attribute related to an appearance of the product, by inputting the video data into the first machine learning model. The information processing device 100 acquires information regarding the weight of the product, from the accounting machine 40 that has measured the weight of the product placed on the scale unit. The information processing device 100 performs machine learning of the second machine learning model, using the specified attribute of the product as input data and the acquired information regarding the weight of the product as correct answer data.

Figure 2:
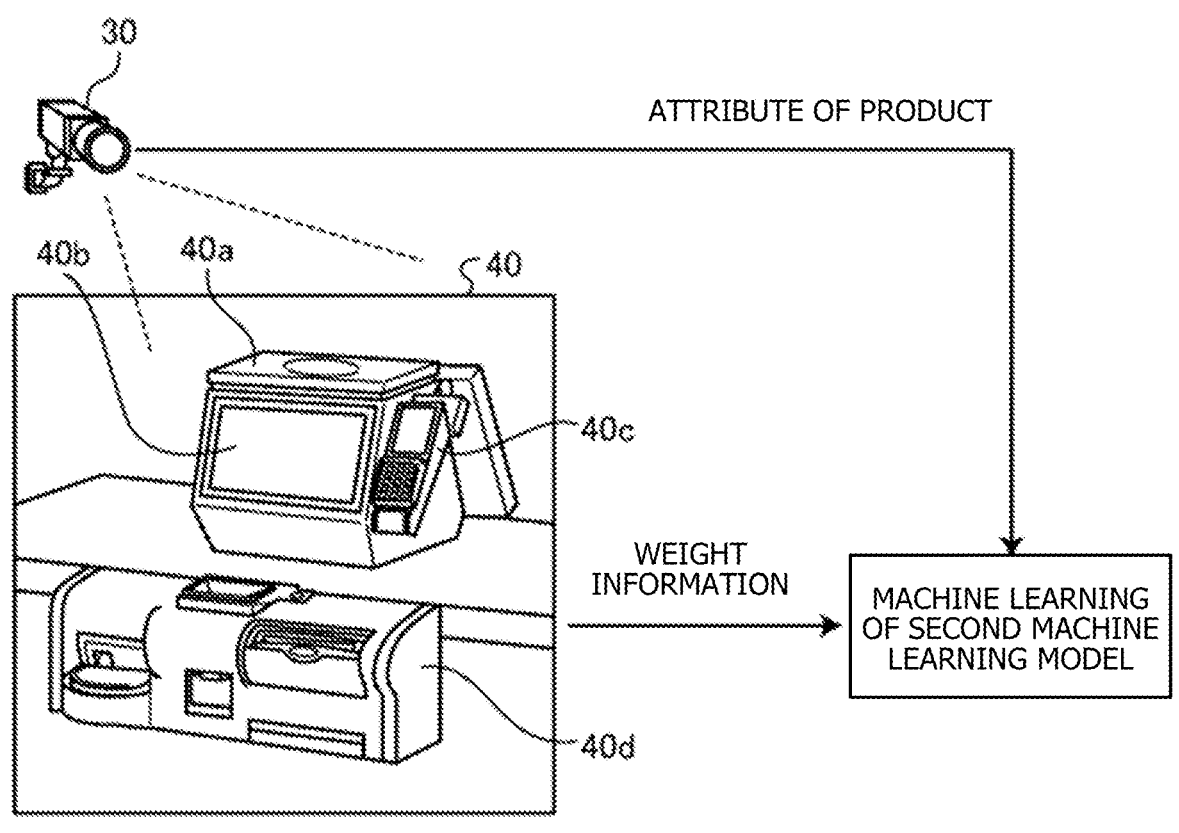
FIG. 2 is a diagram for explaining processing of an information processing device according to the first embodiment.

This will be specifically described with reference to FIG. 2. FIG. 2 is a diagram for explaining processing of the information processing device 100 according to the first embodiment. As illustrated in FIG. 2, the accounting machine 40 includes a scale unit 40a, a touch panel 40b, a card reader 40c, and a cash payment machine 40d. The scale unit 40a is a scale used to measure a weight of a product. The touch panel 40b displays various types of information regarding the product and receives selection of the number of products or selection of a price according to an operation of the user. Furthermore, the touch panel 40b displays the weight of the product measured by the scale unit 40a, the price of the product, a total amount to be paid, or the like. The card reader 40c reads credit card information so as to make a payment using a credit card. The cash payment machine 40d receives cash to make a payment using cash.

With such a configuration, the information processing device 100 specifies the attribute of the product placed on the scale unit 40a, from the video data of the product placed on the scale unit 40a imaged by the camera 30, through image analysis or the like. On the other hand, the information processing device 100 acquires weight information of the product placed on the scale unit 40a, from the accounting machine 40. Then, the information processing device 100 generates the second machine learning model that estimates the weight information from the attribute of the product, based on a correspondence relationship between the attribute and the weight information of the product.

By using the second machine learning model trained in this way, the information processing device 100 can estimate the weight of the product from the image data of the product. Therefore, since the information processing device 100 can estimate the weight of the product to be purchased, the information processing device 100 can detect a fraudulent behavior using the weight.

<Functional Configuration>

Figure 3:
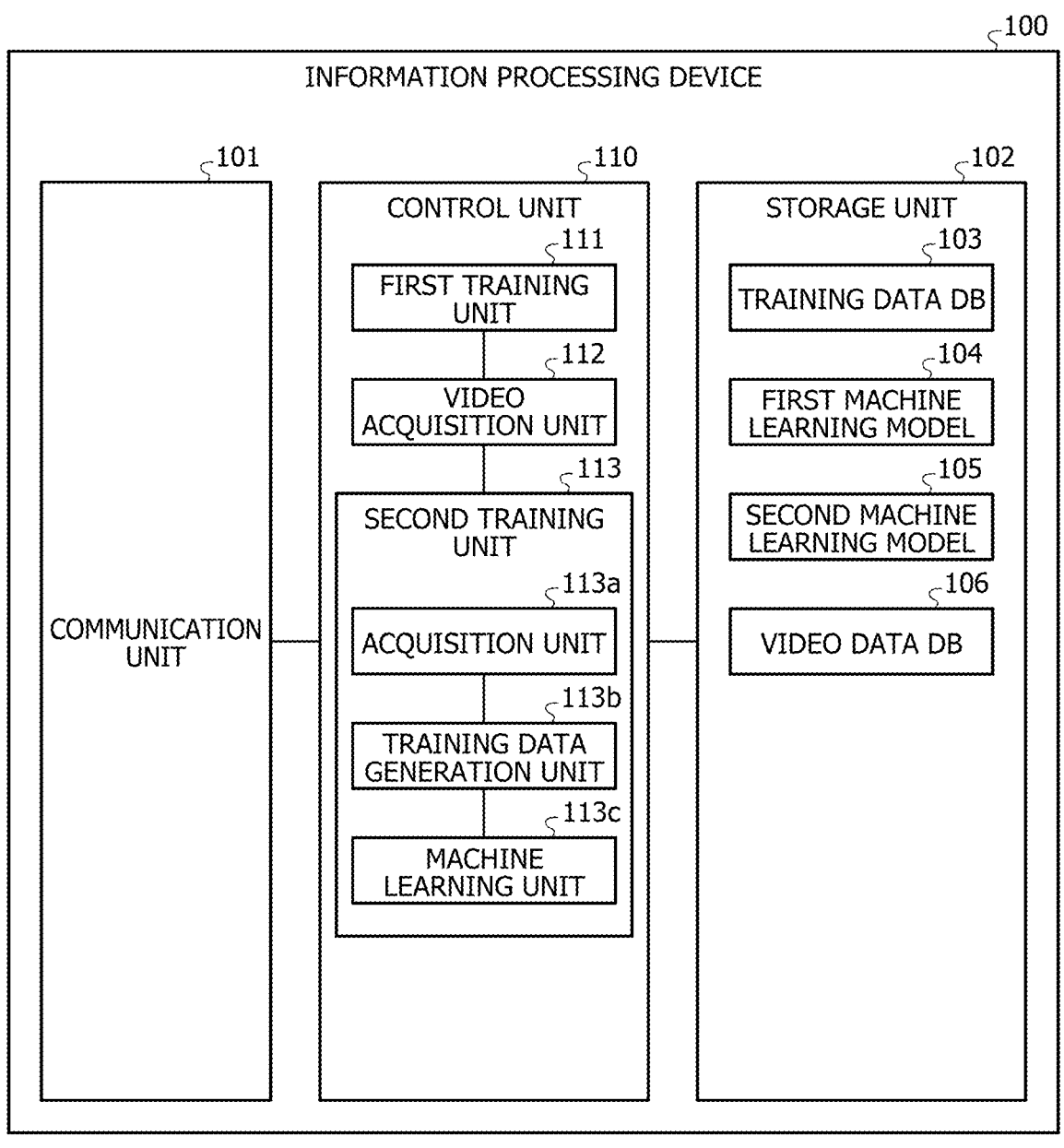
FIG. 3 is a functional block diagram illustrating a functional configuration of an information processing device according to the first embodiment.

FIG. 3 is a functional block diagram illustrating a functional configuration of the information processing device 100 according to the first embodiment. As illustrated in FIG. 3, the information processing device 100 includes a communication unit 101, a storage unit 102, and a control unit 110.

The communication unit 101 is a processing unit that controls communication with another device and, for example, is implemented by a communication interface or the like. For example, the communication unit 101 receives video data from the camera 30 and receives weight information of a product from the accounting machine 40 by the administrator's terminal 60.

The storage unit 102 is a processing unit that stores various types of data, programs executed by the control unit 110, or the like, and is implemented by a memory, a hard disk, or the like. The storage unit 102 stores a training data DB 103, a first machine learning model 104, a second machine learning model 105, and a video data DB 106.

The training data DB 103 is a database that stores training data used for machine learning of the first machine learning model 104. FIG. 4 is a diagram for explaining training data used to train the first machine learning model 104. As illustrated in FIG. 4, the training data has an "explanatory variable" and an "objective variable". The "explanatory variable" is image data in which a product is imaged, and the "objective variable" is an attribute of the product. The attribute of the product is, for example, a color of the product, a size of the product, a shape of the product, or the like, and appearance characteristics of the product or the like can be adopted.

The first machine learning model 104 is an example of a machine learning model trained to estimate the attribute of the product imaged in the image data. For example, the first machine learning model 104 estimates and outputs the attribute of the product, according to input of the video data in which the product is imaged. Note that the first machine learning model 104 may have already been trained or trained by the control unit 110.

The second machine learning model 105 is an example of a machine learning model trained to estimate the weight of the product. For example, the second machine learning model 105 estimates and outputs the weight of the product, according to input of the attribute of the product.

The video data DB 106 is a database that stores the video data captured by the camera 30 provided in the accounting machine 40. For example, the video data DB 106 stores the video data for each accounting machine 40 or each camera 30.

Returning to FIG. 3, the control unit 110 is a processing unit that performs overall control of the information processing device 100 and, for example, is implemented by a processor or the like. The control unit 110 includes a first training unit 111, a video acquisition unit 112, and a second training unit 113. Note that the first training unit 111, the video acquisition unit 112, and the second training unit 113 are implemented by an electronic circuit included in a processor, a process executed by the processor, or the like.

Figure 5:
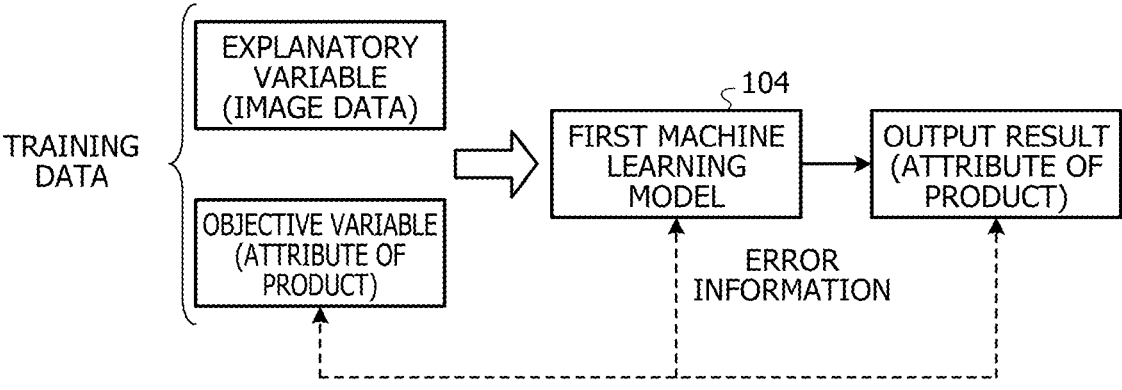
FIG. 5 is a diagram for explaining training of the first machine learning model.

The first training unit 111 is a processing unit that performs training of the first machine learning model 104, using the training data stored in the training data DB 103. FIG. 5 is a diagram for explaining the training of the first machine learning model 104. As illustrated in FIG. 5, the first training unit 111 inputs training data using "image data" as the explanatory variable and "attribute of product" as the objective variable into the first machine learning model 104, and acquires an output result "attribute of product" of the first machine learning model 104. Then, the first training unit 111 calculates error information between the output result "attribute of product" and the objective variable "attribute of product" of the first machine learning model 104. Thereafter, the first training unit 111 performs machine learning for updating a parameter of the first machine learning model 104 so as to reduce an error, through backpropagation.

The video acquisition unit 112 is a processing unit that acquires video data from the camera 30. For example, the video acquisition unit 112 acquires video data from the camera 30 provided in the accounting machine 40 as needed and stores the video data in the video data DB 106.

The second training unit 113 is a processing unit that includes an acquisition unit 113*a*, a training data generation unit 113*b*, and a machine learning unit 113*c* and generates training data from video data and performs training of the second machine learning model 105.

The acquisition unit 113*a* is a processing unit that acquires video data of the product placed on the scale unit 40*a* included in the accounting machine 40 and information regarding a weight of the product from the accounting machine 40 that has measured the weight of the product placed on the scale unit 40*a*. Specifically, the acquisition unit 113*a* acquires image data of the product placed on the scale unit 40*a*, from the video data acquired by the video acquisition unit 112.

Figure 6:
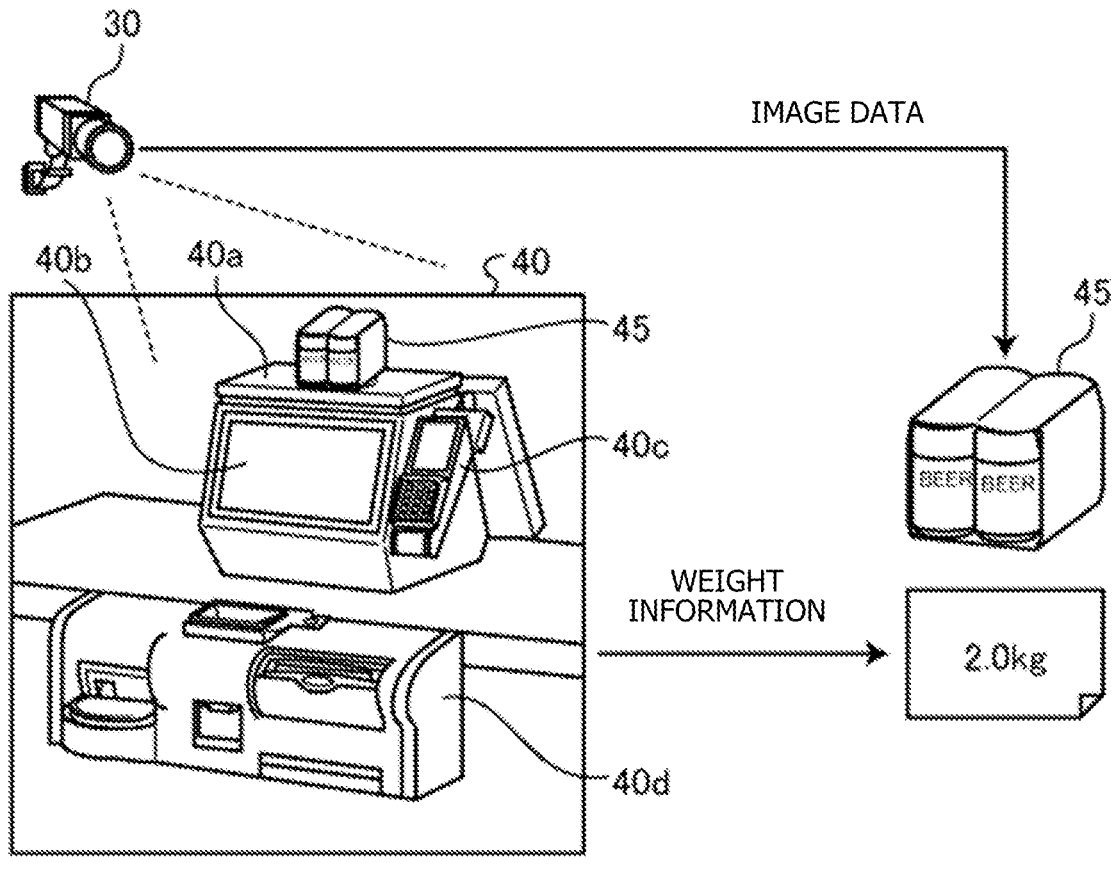
FIG. 6 is a diagram for explaining acquired data.

FIG. 6 is a diagram for explaining acquired data. As illustrated in FIG. 6, the acquisition unit 113*a* acquires image data captured by the camera 30 that is image data in which a state where a 6-beer package product 45 (set product) is placed on the scale unit 40*a* of the accounting machine 40 is imaged. Furthermore, the acquisition unit 113*a* acquires "2.0 kg" that is the weight of the 6-beer package product 45 measured by the scale unit 40*a* of the accounting machine 40, from the accounting machine 40.

Then, the acquisition unit 113*a* stores the image data and the weight information (2.0 kg) of the 6-beer package product 45 in the storage unit 102 in association, and outputs the image data and the weight information to the training data generation unit 113*b*. In this way, the acquisition unit 113*a* acquires the image data of the product and the weight information of the product, each time when the product is placed on the scale unit 40*a*.

Figure 7:
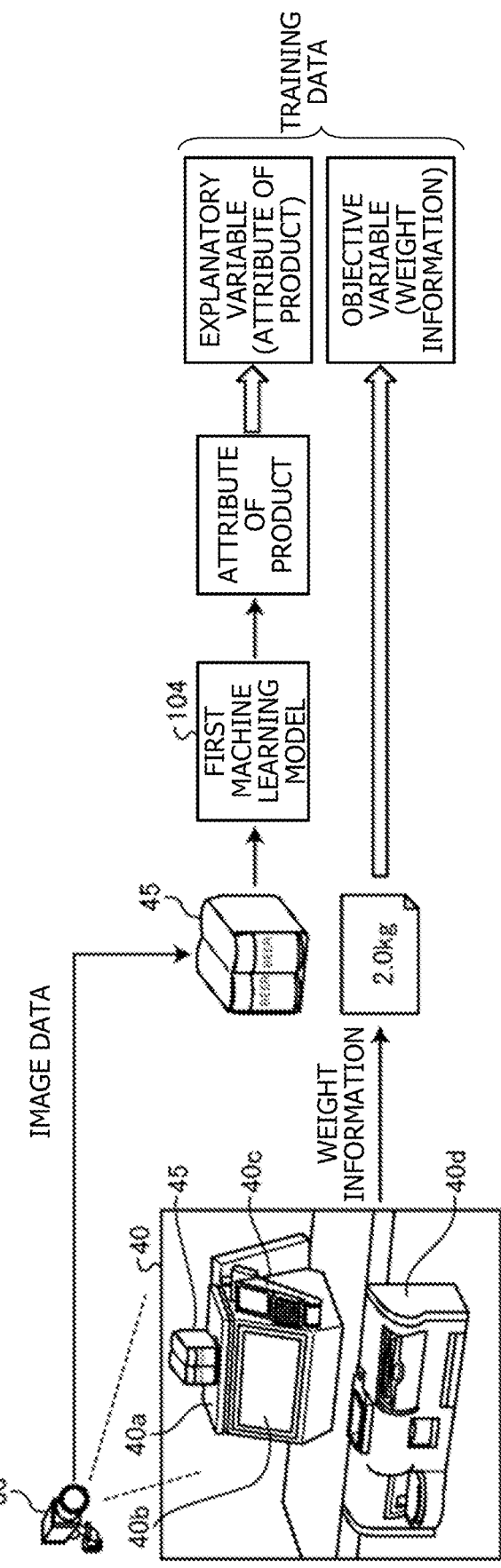
FIG. 7 is a diagram for explaining an example of generating training data used to train a second machine learning model.

The training data generation unit 113*b* is a processing unit that generates training data using the data acquired from the acquisition unit 113*a*. FIG. 7 is a diagram for explaining an example of generating training data used to train the second machine learning model 105. As illustrated in FIG. 7, the training data generation unit 113*b* inputs the image data of the 6-beer package product 45 into the trained first machine learning model 104 and acquires attributes "beer, six pack, length 20 cm" of the product estimated by the first machine learning model 104.

Then, the training data generation unit 113*b* generates training data using the attributes "beer, six pack, length 20 cm" of the product estimated by the first machine learning model 104 as an explanatory variable and the weight information "2.0 kg" acquired by the acquisition unit 113*a* as an objective variable. In this way, the training data generation unit 113*b* generates a plurality of pieces of training data using the data of each product acquired by the acquisition unit 113*a* and stores the training data in the training data DB 103.

Figure 8:
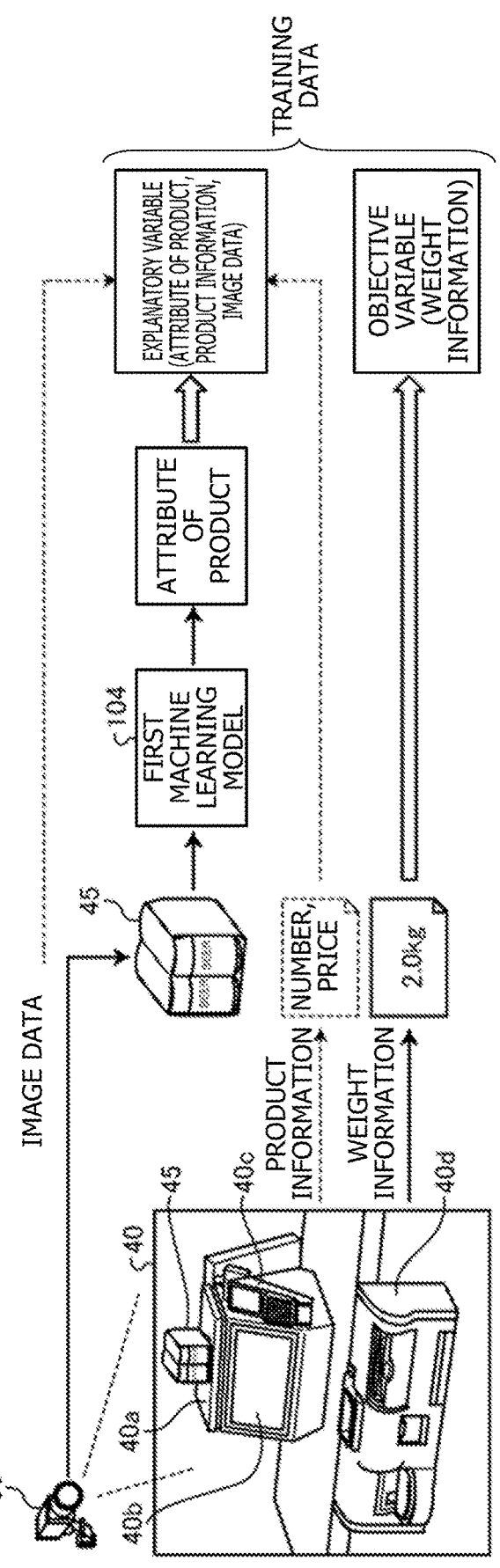
FIG. 8 is a diagram for explaining another example of generating the training data used train the second machine learning model.

Furthermore, the training data generation unit 113*b* can use another piece of information that can be acquired by the acquisition unit 113*a* and another piece of information that can be acquired from the accounting machine 40, as the explanatory variable. FIG. 8 is a diagram for explaining another example of generating the training data used to train the second machine learning model 105. As illustrated in FIG. 8, the training data generation unit 113*b* can add the image data of the 6-beer package product 45 acquired by the acquisition unit 113*a* as the explanatory variable.

Furthermore, the training data generation unit 113*b* can acquire the name of the product, the number of products, the price of the product, or the like selected by the user as a purchase target from displayed product information, through the user's operation received via the touch panel 40*b* of the accounting machine 40 and add the acquired information as the explanatory variable. In this way, by increasing the number of explanatory variables of the training data, it is possible to improve estimation accuracy of the weight information.

The machine learning unit 113*c* is a processing unit that performs machine learning of the second machine learning model 105, using the training data generated by the training data generation unit 113*b*. That is, the machine learning unit 113*c* generates the second machine learning model 105 that estimates a weight of the product from the attribute or the like of the product.

Figure 9:
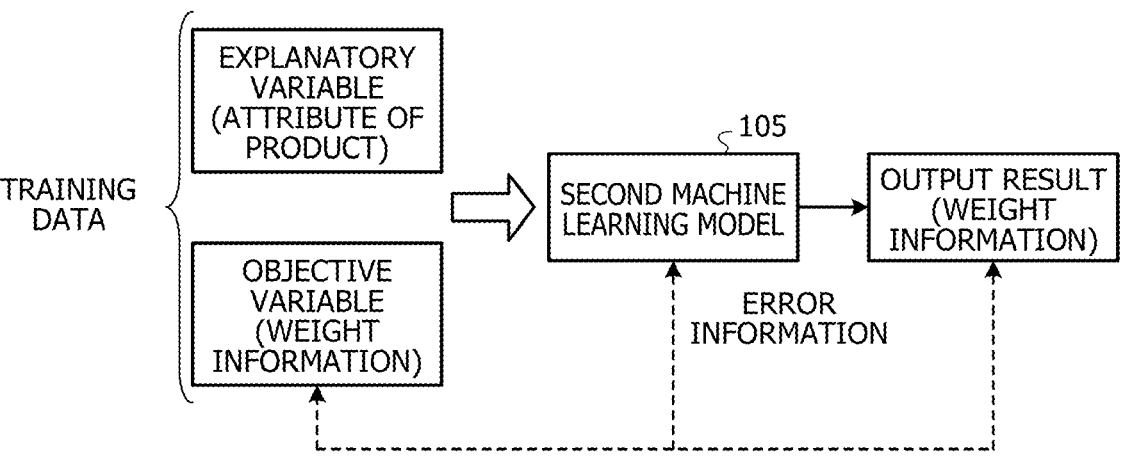
FIG. 9 is a diagram for explaining the training of the second machine learning model.

FIG. 9 is a diagram for explaining the training of the second machine learning model 105. As illustrated in FIG. 9, the machine learning unit 113*c* inputs training data using "attribute of product" as the explanatory variable and "weight information" as the objective variable into the second machine learning model 105 and acquires an output result "weight information" of the second machine learning model 105. Then, the machine learning unit 113*c* calculates error information between the output result "weight information" of the second machine learning model 105 and the objective variable "weight information". Thereafter, the machine learning unit 113c performs machine learning for updating a parameter of the second machine learning model 105 so as to reduce an error, through backpropagation.

<Flow of Processing>

Figure 10:
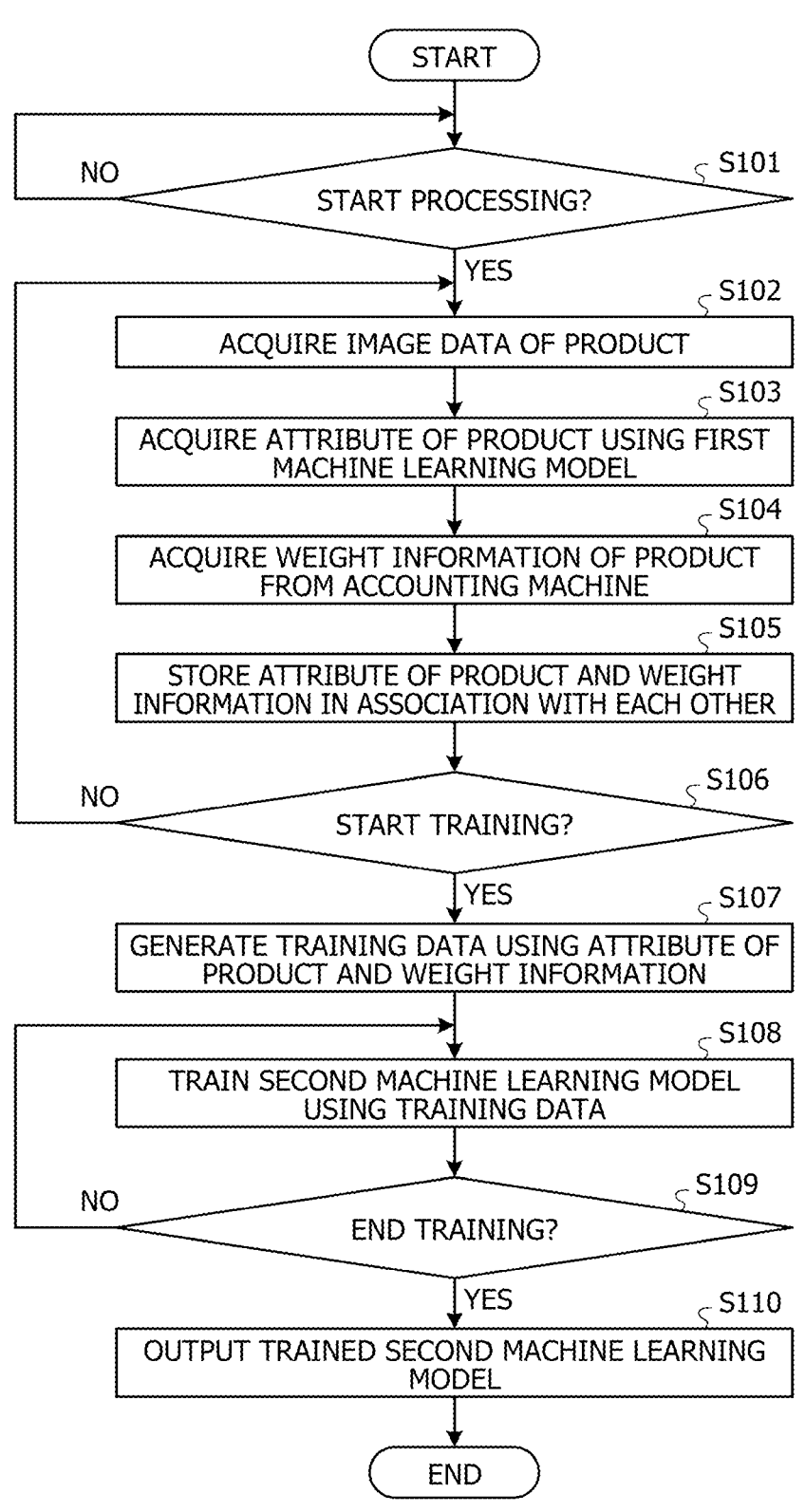
FIG. 10 is a flowchart illustrating a flow of processing.

FIG. 10 is a flowchart illustrating a flow of processing. As illustrated in FIG. 10, when being instructed to start processing (S101: Yes), the information processing device 100 acquires image data of a state in which the product is placed on the scale unit 40a (S102).

Subsequently, the information processing device 100 inputs the image data into the first machine learning model 104 and acquires an attribute of the product imaged in the image data (S103). Furthermore, the information processing device 100 acquires weight information of the product measured by the scale unit 40a of the accounting machine 40, from the accounting machine 40 (S104). Then, the information processing device 100 stores the attribute of the product and the weight information of the product in a storage unit 102 or the like in association with each other (S105).

Here, in a case where the information processing device 100 is not instructed to start training (S106: No), the information processing device 100 repeats the processing in and subsequent to S102. On the other hand, in a case of being instructed to start training (S106: Yes), the information processing device 100 generates training data using the attribute and the weight information of the product (S107) and performs the training of the second machine learning model 105 using the training data (S108).

Here, in a case where the information processing device 100 continues training (S109: No), the information processing device 100 repeats the processing in and subsequent to S108. On the other hand, in a case of ending the training (S109: Yes), the information processing device 100 outputs the trained second machine learning model 105 to the storage unit 102 (S110).

Note that, here, a series of flows from the generation of the training data to the execution of the training has been described. However, training data generation processing and training processing can be executed as different flows.

Effects

As described above, since the information processing device 100 can estimate the weight of the product from the image data of the product, fraud in the accounting machine 40 including fraud for pretending to purchase an expensive product by scanning an inexpensive product instead of the expensive product can be detected.

The information processing device 100 can generate the second machine learning model 105 by training using the color of the product, the size of the product, the shape of the product, the image data of the product, and product information (name, the number, price, or the like of product) selected by the user, as the explanatory variable. Therefore, the information processing device 100 can improve accuracy of the second machine learning model 105. Furthermore, since the information processing device 100 can select the explanatory variable according to a situation of the store or the like, the information processing device 100 can generate the second machine learning model 105 in consideration of cost and effects.

Second Embodiment

Next, fraud detection using the second machine learning model 105 generated in the first embodiment will be described. Here, an example will be described where the information processing device 100 described in the first embodiment detects fraud. However, a device for performing machine learning and a device for detecting fraud may be implemented by different devices.

Figure 11:
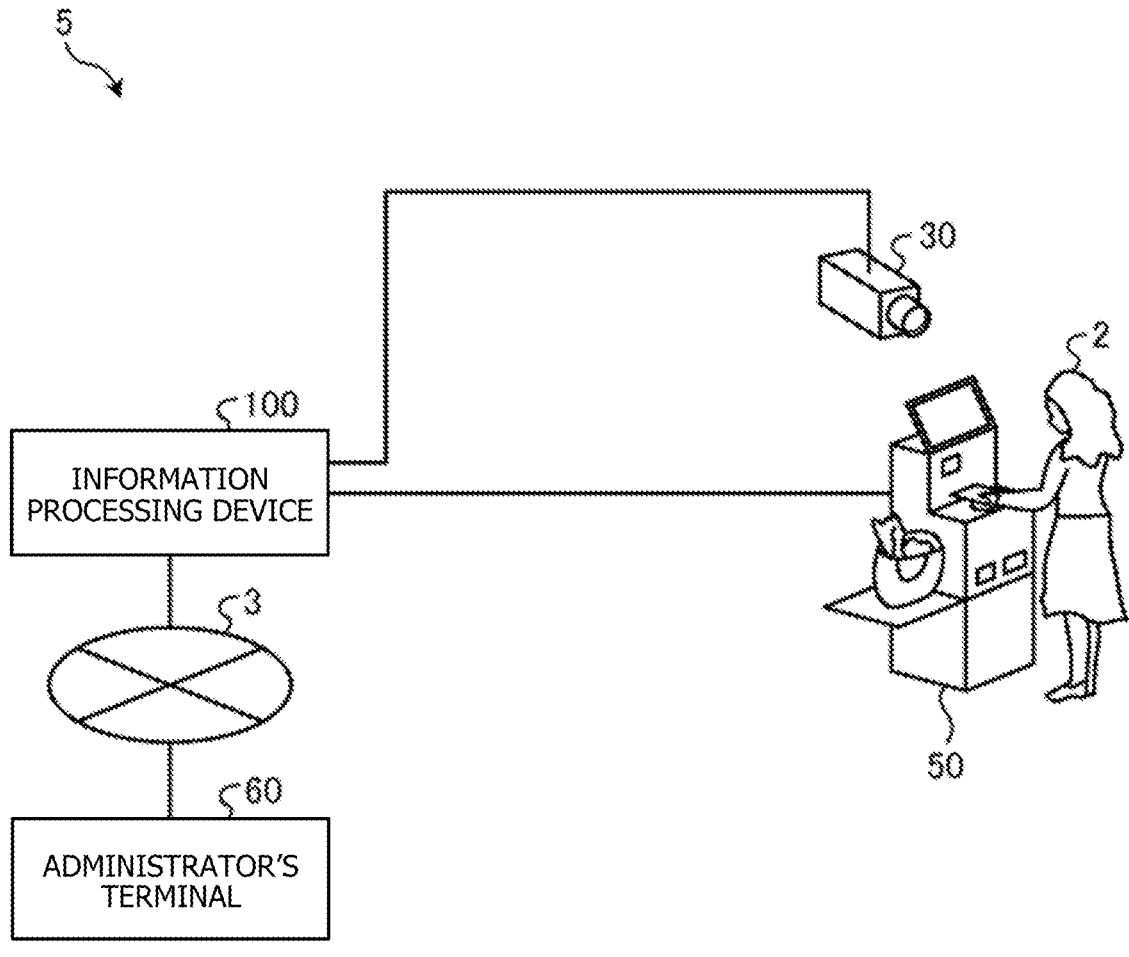
FIG. 11 is a diagram illustrating an overall configuration example of a self-checkout machine system according to a second embodiment.

FIG. 11 is a diagram illustrating an overall configuration example of a self-checkout machine system according to a second embodiment. As illustrated in FIG. 11, the self-checkout machine system 5 includes a camera 30, a self-checkout machine 50, an administrator's terminal 60, and the information processing device 100.

The information processing device 100 is an example of a computer coupled to the camera 30 and the self-checkout machine 50. The information processing device 100 is coupled to the administrator's terminal 60, via a network 3 for which various wired and wireless communication networks can be adopted. The camera 30 and the self-checkout machine 50 may be coupled to the information processing device 100, via the network 3.

The camera 30 is an example of a camera that captures a video of a region including the self-checkout machine 50. The camera 30 transmits data of a video to the information processing device 100.

The self-checkout machine 50 is an example of a POS cash register system or an accounting machine with which a user 2 who purchases a product performs operations from reading a barcode of the product to payment and has a configuration similar to that of the accounting machine 40 in the first embodiment. For example, when the user 2 moves a product to be purchased to a scan region of the self-checkout machine 50, the self-checkout machine 50 scans a barcode of the product and registers the product as a product to be purchased. Furthermore, the user 2 registers a price corresponding to the weight of the product, by placing the product to be purchased on the scale unit of the self-checkout machine 50.

Note that, as described above, the self-checkout machine 50 is an example of a self-checkout machine that registers (register operation) a product to be purchased by a customer and makes a payment, and is referred to as, for example, Self checkout, automated checkout, self-checkout machine, self-check-out register, or the like. The barcode is one type of an identifier representing a numerical value or a character depending on thicknesses of striped lines, and the self-checkout machine 50 can specify the price, the type (for example, food), or the like of the product by scanning (reading) the barcode. The barcode is an example of a code, and two dimensional codes such as a quick response (QR) code having the same function can be used, in addition to the barcode.

The user 2 repeatedly performs the operation of the product registration described above, and when the scan of the product is completed, the user 2 operates a touch panel or the like of the self-checkout machine 50, and makes a settlement request. Upon receiving the settlement request, the self-checkout machine 50 presents the number of products to be purchased, the purchase price, or the like, and executes settlement processing. The self-checkout machine 50 stores information regarding the products that have been scanned from when the user 2 starts scanning to when the settlement request is issued, in a storage unit and transmits the information to the information processing device 100 as self-checkout machine data (product information).

The administrator's terminal 60 is an example of a terminal device used by an administrator of a store. The administrator's terminal 60 receives an alert notification indicating that fraud has been performed regarding purchase of a product or the like, from the information processing device 100.

With such a configuration, the information processing device 100 acquires an attribute regarding an appearance of the product to be a behavior target of a person who operates the self-checkout machine 50, using the first machine learning model 104 described above. The information processing device 100 acquires information regarding the weight of the product from the attribute regarding the appearance of the product, using the second machine learning model 105 described above. Then, the information processing device 100 detects a behavior of the person who operates the self-checkout machine 50, based on the information regarding the weight of the product imaged in the video data. In this way, the information processing device 100 can detect fraud in the accounting machine.

Figure 12:
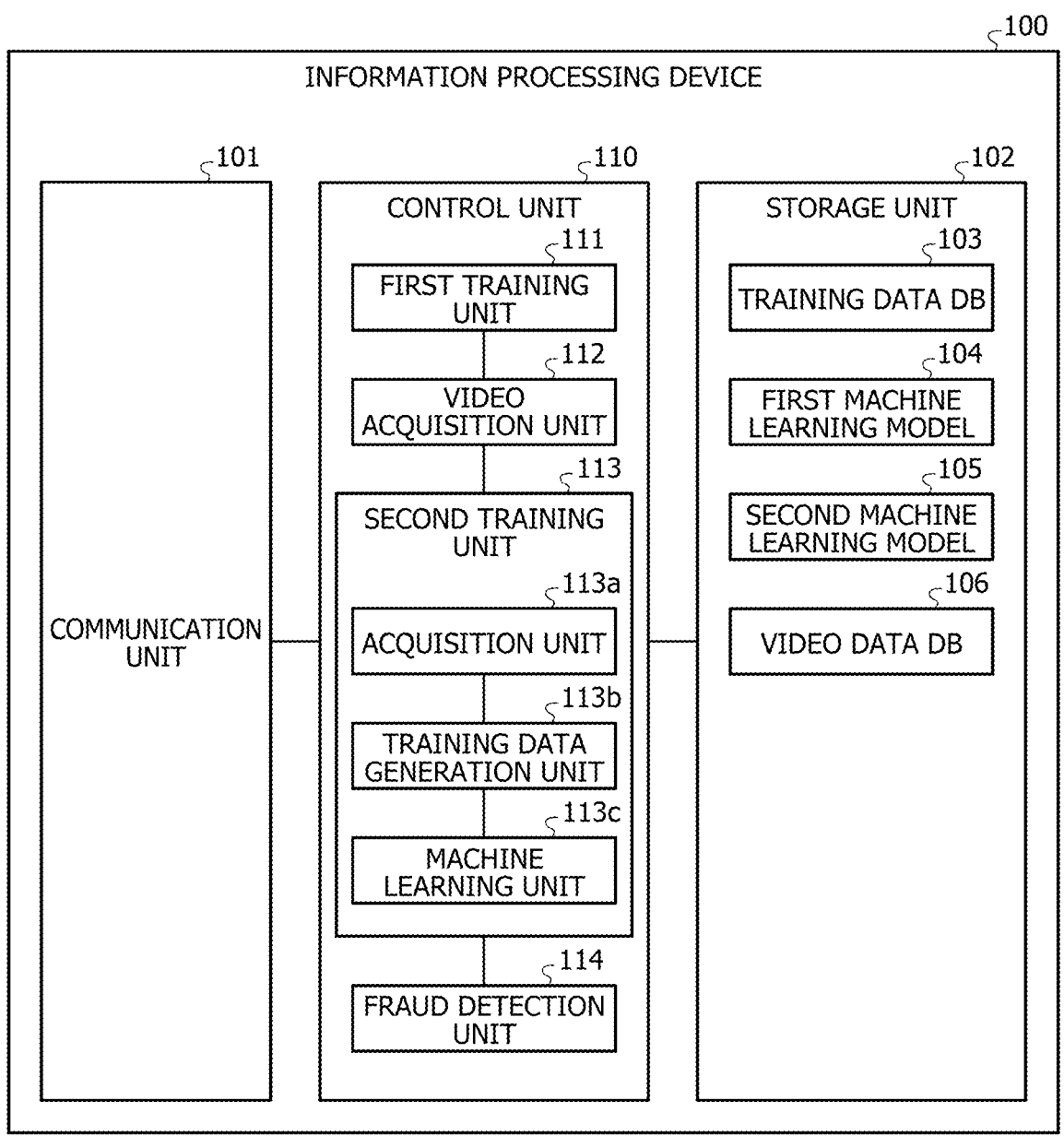
FIG. 12 is a functional block diagram illustrating a functional configuration of an information processing device according to the second embodiment.

FIG. 12 is a functional block diagram illustrating a functional configuration of the information processing device 100 according to the second embodiment. As illustrated in FIG. 12, as in the first embodiment, the information processing device 100 includes a communication unit 101, a storage unit 102, and a control unit 110.

As in the first embodiment, the communication unit 101 receives video data from the camera 30 and transmits a processing result by the control unit 110 to the administrator's terminal 60. As in the first embodiment, the storage unit 102 stores a training data DB 103, a first machine learning model 104, a second machine learning model 105, and a video data DB 106. Note that the first machine learning model 104 and the second machine learning model 105 have been already trained with the method according to the first embodiment.

The control unit 110 is a processing unit that performs overall control of the information processing device 100 and, for example, is implemented by a processor or the like. The control unit 110 includes a first training unit 111, a video acquisition unit 112, a second training unit 113, and a fraud detection unit 114. Note that the first training unit 111, the video acquisition unit 112, the second training unit 113, and the fraud detection unit 114 are implemented by an electronic circuit included in a processor, a process executed by the processor, or the like.

Here, the fraud detection unit 114 that is a difference from the first embodiment will be described. The fraud detection unit 114 is a processing unit that detects a fraudulent behavior of the user 2 who uses the self-checkout machine 50, through image analysis using the trained machine learning model.

Specifically, the fraud detection unit 114 acquires video data in which the region including the product that is the target of the behavior of the person who operates the self-checkout machine 50 is imaged, from the video acquisition unit 112. The fraud detection unit 114 acquires an attribute regarding an appearance of the product by inputting the acquired video data into the first machine learning model 104. The fraud detection unit 114 estimates weight information of the product imaged in the video data, by inputting the attribute of the product into the second machine learning model 105. The fraud detection unit 114 detects a fraudulent behavior of the user 2 who uses the self-checkout machine 50, based on the information regarding the weight of the product acquired using the second machine learning model 105.

Figure 13:
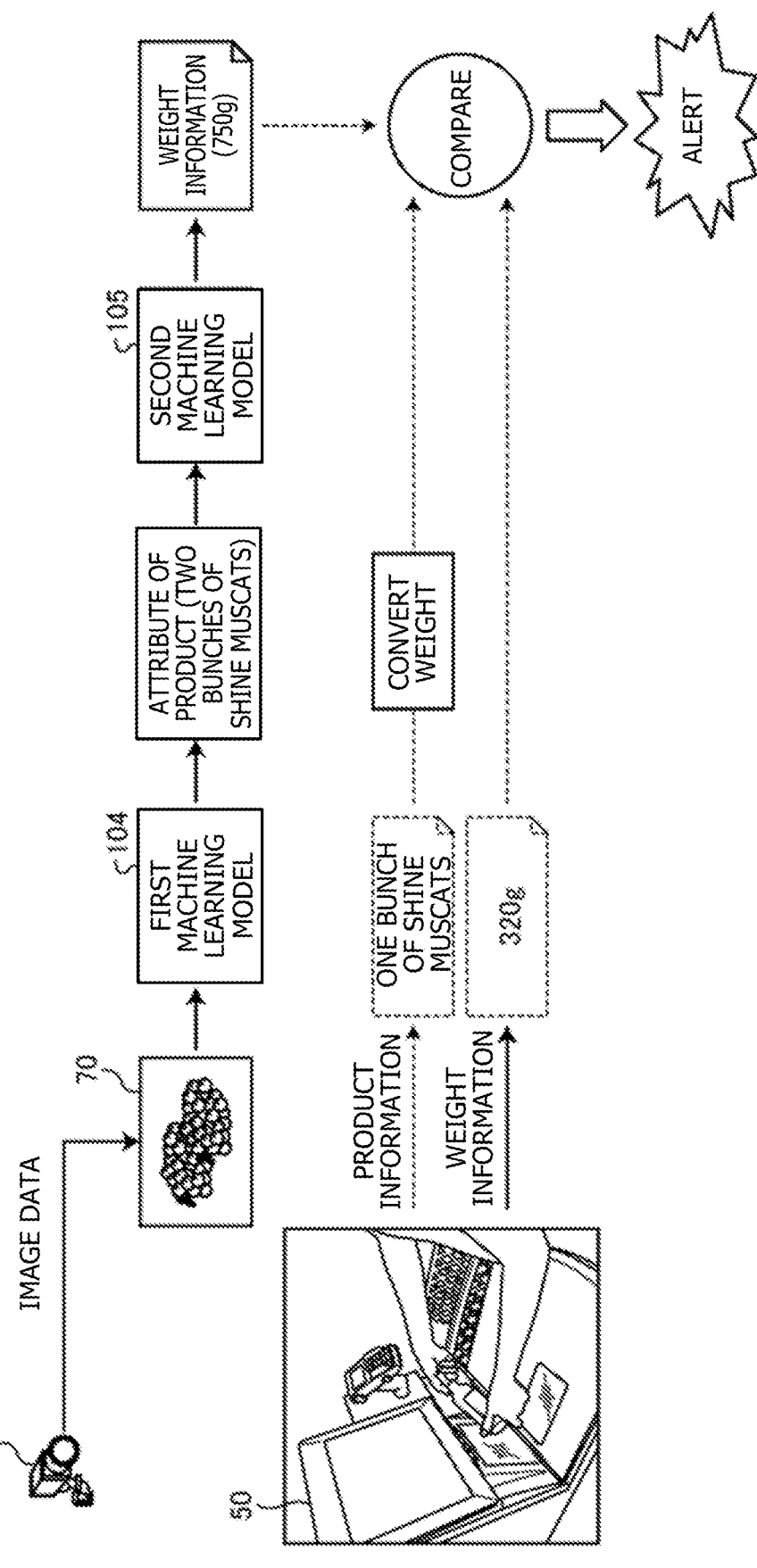
FIG. 13 is a diagram for explaining fraud detection processing according to the second embodiment.

FIG. 13 is a diagram for explaining fraud detection processing according to the second embodiment. As illustrated in FIG. 13, the fraud detection unit 114 acquires image data 70 of a product "two bunches of shine muscats", inputs the image data 70 into the first machine learning model 104, and acquires an attribute of the product "two bunches of shine muscats". Subsequently, the fraud detection unit 114 inputs the attribute of the product "two bunches of shine muscats" into the second machine learning model 105 and estimates weight information of the product "750 g".

On the other hand, the fraud detection unit 114 acquires product information "one bunch of shine muscats" registered in the self-checkout machine 50 by the user 2 who holds the product "two bunches of shine muscats" and weight information "320 g" measured by the self-checkout machine 50 at the same timing as the image data 70, from the self-checkout machine 50.

Here, the fraud detection unit 114 compares the weight information specified from the image data 70 with the information acquired from the self-checkout machine 50 and detects a fraudulent behavior of the user 2.

In the example described above, since the weight information "750 g" specified from the image data 70 is different from the weight information "320 g" measured by the self-checkout machine 50 (for example, weight difference is equal to or more than threshold), the fraud detection unit 114 determines that the fraudulent behavior by the user 2 has occurred. That is, the fraud detection unit 114 can detect that the user 2 has performed fraud for pretending to purchase a target product by scanning another product without scanning the holding product.

Furthermore, with reference to a weight list of products that has been prepared in advance or the like, the fraud detection unit 114 specifies "280 g" as weight information of the product information "one bunch of shine muscats" registered by the user 2 in the self-checkout machine 50. Then, since the weight information "750 g" specified from the image data 70 is different from the weight information "280 g" of the product information "one bunch of shine muscats" registered in the self-checkout machine 50 by the user 2 (for example, weight difference is equal to or more than threshold), the fraud detection unit 114 determines that a fraudulent behavior of the user 2 has occurred. That is, the fraud detection unit 114 can detect that the user 2 has performed the fraud for pretending to purchase two bunches of shine muscats as scanning only one bunch of shine muscats.

Third Embodiment

Incidentally, while the embodiment of the present disclosure has been described above, the present disclosure may be implemented in a variety of different modes in addition to the embodiment described above.
(Numerical Values, Etc.)

The numbers of self-checkout machines and cameras, numerical examples, training data examples, the number of pieces of training data, machine learning models, each class name, the number of classes, data formats, or the like used in the above embodiments are merely examples and can be arbitrarily changed. In addition, the processing flow described in each flowchart may be appropriately changed in a range without contradiction. Furthermore, for each model, a model generated by various algorithms such as a neural network may be adopted.

Furthermore, the information processing device 100 can use known techniques such as another machine learning model for detecting a position, object detection techniques, or position detection techniques, for the scan position and the position of the shopping basket. For example, since the information processing device 100 can detect the position of the shopping basket based on a time-series change of the frame that is a difference between the frames (image data), the information processing device 100 may perform detection using the position and generate another model using the position. Furthermore, by designating the size of the shopping basket in advance, in a case where an object having that size is detected from the image data, the information processing device 100 can identify the object as the position of the shopping basket. Note that, since the scan position is a position fixed to some extent, the information processing device 100 can identify a position designated by an administrator or the like as the scan position.

(System)

Pieces of information including a processing procedure, a control procedure, a specific name, various types of data, and parameters described above or illustrated in the drawings may be optionally changed unless otherwise specified.

Furthermore, specific forms of distribution and integration of components of individual devices are not limited to those illustrated in the drawings. For example, the first training unit 111 and the second training unit 113 may be integrated. That is, all or some of the components may be functionally or physically dispersed or integrated in optional units, depending on various kinds of loads, use situations, or the like. Moreover, all or some of the respective processing functions of the respective devices may be implemented by a central processing unit (CPU) and a program to be analyzed and executed by the CPU, or may be implemented as hardware by wired logic.

Moreover, all or some of processing functions individually performed in each device can be implemented by a central processing unit (CPU) and a program analyzed and executed by the CPU, or may be implemented as hardware by wired logic.

(Hardware)

Figure 14:
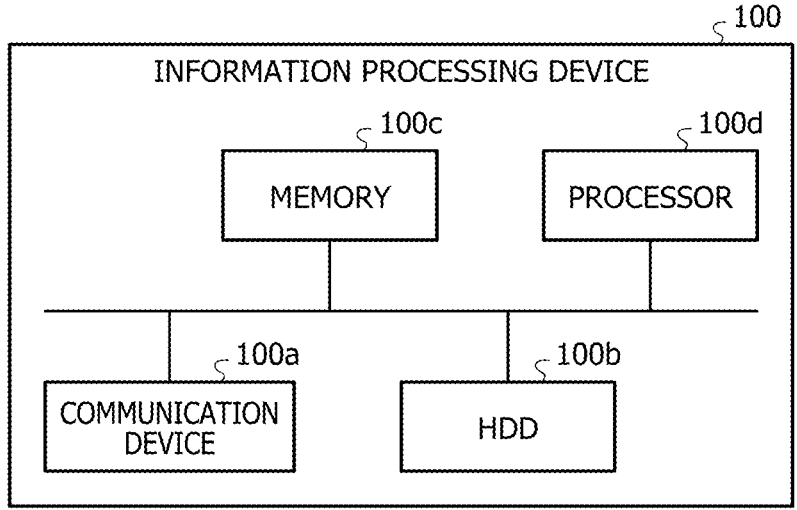
FIG. 14 is a diagram for explaining a hardware configuration example.

FIG. 14 is a diagram for explaining a hardware configuration example. Here, the information processing device 100 will be described as an example. As illustrated in FIG. 14, the information processing device 100 includes a communication device 100a, a hard disk drive (HDD) 100b, a memory 100c, and a processor 100d. Furthermore, the individual units illustrated in FIG. 14 are mutually coupled by a bus or the like.

The communication device 100a is a network interface card or the like and communicates with another device. The HDD 100b stores programs for operating the functions illustrated in FIG. 3 and databases (DBs).

The processor 100d reads a program that executes processing similar to the processing of each processing unit illustrated in FIG. 3 from the HDD 100b or the like, and develops the read program in the memory 100c to operate a process that executes each function described with reference to FIG. 3 or the like. For example, this process executes a function similar to the function of each processing unit included in the information processing device 100. Specifically, the processor 100d reads a program having functions similar to those of the first training unit 111, the video acquisition unit 112, a second machine learning unit 113, or the like, from the HDD 100b or the like. Then, the processor 100d executes a process for executing processing similar to those of the first training unit 111, the video acquisition unit 112, the second machine learning unit 113, or the like.

As described above, the information processing device 100 works as an information processing device that executes an information processing method by reading and executing the program. In addition, the information processing device 100 can also implement functions similar to the functions of the above-described embodiments by reading the program described above from a recording medium by a medium reading device and executing the above read program. Note that other programs mentioned in the embodiments are not limited to being executed by the information processing device 100. For example, the embodiments described above may be similarly applied also to a case where another computer or server executes the program or a case where these computer and server cooperatively execute the program.

This program may be distributed via a network such as the Internet. In addition, this program may be recorded in a computer-readable recording medium such as a hard disk, a flexible disk (FD), a compact disc read only memory (CD-ROM), a magneto-optical disk (MO), or a digital versatile disc (DVD) and may be executed by being read from the recording medium by a computer.

Figure 15:
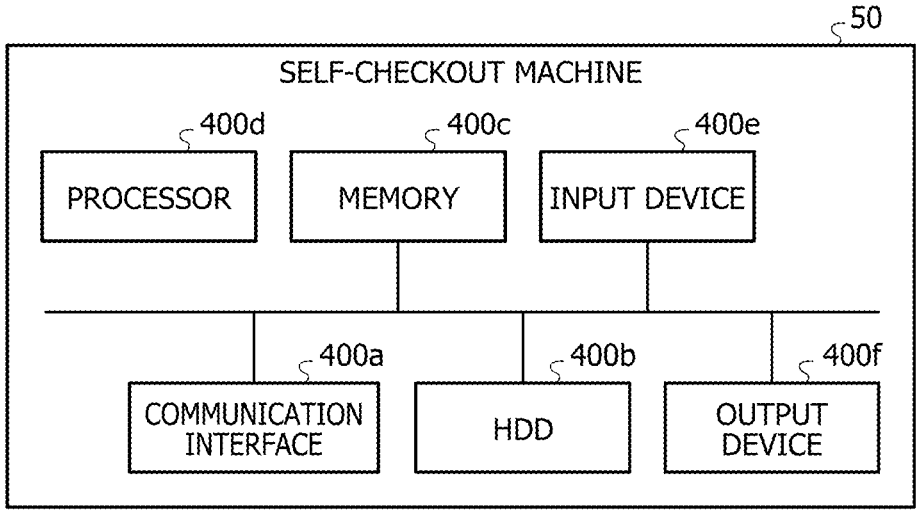
FIG. 15 is a diagram for explaining a hardware configuration example of a self-checkout machine.

FIG. 15 is a diagram for explaining a hardware configuration example of the self-checkout machine 50. Note that the accounting machine 40 and the self-checkout machine 50 have the same hardware configuration. As illustrated in FIG. 15, the self-checkout machine 50 includes a communication interface 400a, an HDD 400b, a memory 400c, a processor 400d, an input device 400e, and an output device 400f. Furthermore, the individual units illustrated in FIG. 15 are mutually coupled by a bus or the like.

The communication interface 400a is a network interface card or the like, and communicates with other information processing devices. The HDD 400b stores a program for operating each function of the self-checkout machine 50 and data.

The processor 400d is a hardware circuit that reads the program that executes processing of each function of the self-checkout machine 50 from the HDD 400b or the like and develops the read program in the memory 400c to operate a process that executes each function of the self-checkout machine 50. That is, this process executes a function similar to each processing unit included in the self-checkout machine 50.

In this way, the self-checkout machine 50 operates as an information processing device that executes operation control processing by reading and executing the program that executes processing of each function of the self-checkout machine 50. Furthermore, the self-checkout machine 50 can implement each function of the self-checkout machine 50 by reading a program from a recoding medium by a medium reading device and executing the read program. Note that other programs mentioned in the embodiments are not limited to being executed by the self-checkout machine 50. For example, the present embodiment may be similarly applied to a case where another computer or server executes the program, or a case where these computer and server cooperatively execute the program.

Furthermore, the program that executes the processing of each function of the self-checkout machine 50 can be distributed via a network such as the Internet. Furthermore, this program can be recorded in a computer-readable recording medium such as a hard disk, an FD, a CD-ROM, an MO, or a DVD, and can be executed by being read from the recording medium by a computer.

The input device 400e detects various input operations by the user, such as an input operation for the program executed by the processor 400d. The input operation includes, for example, a touch operation or the like. In a case of the touch operation, the self-checkout machine 50 further includes a display unit, and the input operation detected by the input device 400*e* may be a touch operation on the display unit. The input device 400*e* may be, for example, a button, a touch panel, a proximity sensor, or the like. Furthermore, the input device 400*e* reads a barcode. The input device 400*e* is, for example, a barcode reader. The barcode reader includes a light source and an optical sensor and scans a barcode.

The output device 400*f* outputs data output from the program executed by the processor 400*d* via an external device coupled to the self-checkout machine 50, for example, an external display device or the like. Note that, in a case where the self-checkout machine 50 includes the display unit, the self-checkout machine 50 does not need to include the output device 400*f*.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information processing program that causes at least one computer to execute a process, the process comprising:

acquiring video data of a product placed on a scale included in a registration machine;

extracting, by a first machine learning model that analyzes the acquired video data, an appearance attribute of the product;

specifying an attribute regarding an appearance of the product, by inputting the acquired video data into a first machine learning model;

acquiring information regarding a measured weight of the product, from the registration machine that has measured a weight of the product placed on the scale; and performing machine learning of a second machine learning model distinct from the first machine learning model, the performing the machine learning including using the extracted appearance attribute as an input feature and the acquired measured weight as a corresponding ground truth label to train the second machine learning model to estimate a weight of a product from an appearance attribute.

2. The non-transitory computer-readable storage medium according to claim 1, wherein the attribute regarding the appearance of the product is one of a color of the product, a size of the product, and a shape of the product.

3. The non-transitory computer-readable storage medium according to claim 1, wherein the performing the machine learning includes performing machine learning of the second machine learning model, by using each of the specified image data of the product and the attribute of the product as training data and the information regarding the weight of the product as correct answer data.

4. The non-transitory computer-readable storage medium according to claim 1, wherein the performing the machine learning includes:

acquiring product information selected by a user, from among items related to products displayed on a display of the registration machine; and performing machine learning of the second machine learning model, by using each of the acquired product information and the attribute of the product as training data and the information regarding the weight of the product as correct answer data.

5. The non-transitory computer-readable storage medium according to claim 1, wherein the process further comprising:

detecting an abnormal behavior of the person who operates the registration machine, based on the information regarding the weight of the product imaged in the video data estimated by using the second machine learning model.

6. An information processing device comprising:

one or more memories; and one or more processors coupled to the one or more memories and the one or more processors configured to:

acquire video data of a product placed on a scale included in a registration machine, extracting, by a first machine learning model that analyzes the acquired video data, an appearance attribute of the product;

specify an attribute regarding an appearance of the product, by inputting the acquired video data into a first machine learning model, acquire information regarding a measured weight of the product, from the registration machine that has measured a weight of the product placed on the scale, and perform machine learning of a second machine learning model distinct from the first machine learning model, the performing the machine learning including using the extracted appearance attribute as an input feature and the acquired measured weight as a corresponding ground truth label to train the second machine learning model to estimate a weight of a product from an appearance attribute.

* * * * *